Aug. 16, 1966  E. J. SOVATKIN  3,266,301
TONOMETER
Filed March 14, 1963
FIG. 1.
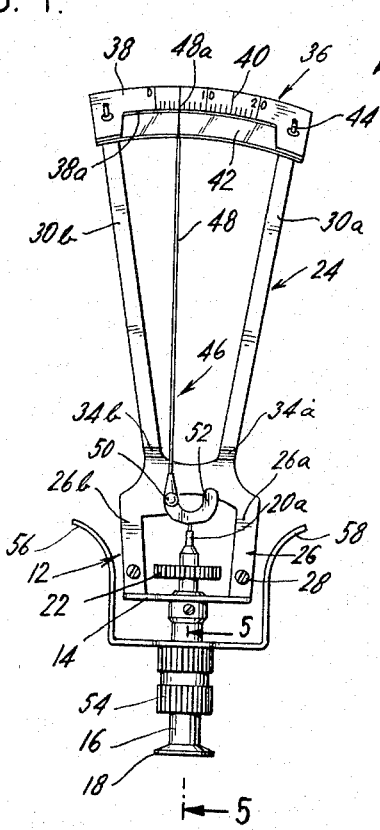
FIG. 2.
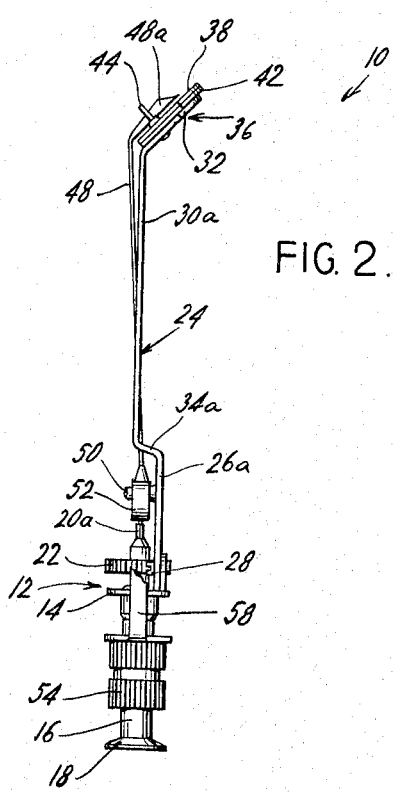
FIG. 3.
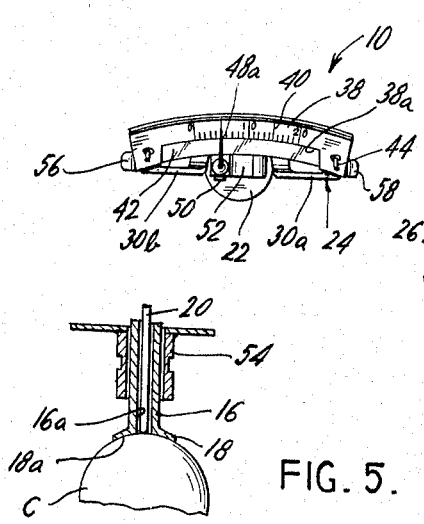
FIG. 4.
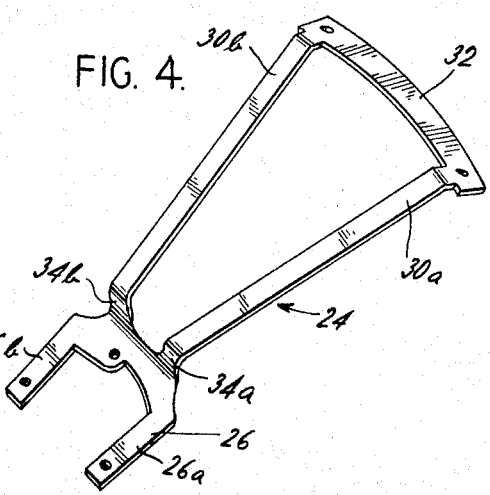
FIG. 5.
INVENTOR.
EDWARD J. SOVATKIN
BY
Amster + Levy
ATTORNEYS

United States Patent Office 3,266,301
Patented August 16, 1966

3,266,301
TONOMETER
Edward J. Sovatkin, New York, N.Y., assignor to J. Sklar Manufacturing Co., Long Island City, N.Y., a corporation of New York
Filed Mar. 14, 1963, Ser. No. 265,259
5 Claims. (Cl. 73—80)

The present invention relates generally to ophthalmic equipment, and in particular to a tonometer which is adapted to rest against the cornea of the eye for measuring ocular tension.

In U.S. Patent No. 2,520,223 of August 29, 1950, which is assigned to the assignee of the instant application, there is shown a tonometer for measuring ocular tension by registering the depth of indentation produced in the cornea and for providing a reading on an appropriate calibrated scale of such ocular tension. Such tonometer, which has become a widely used diagnostic instrument, includes a depending housing which terminates in a pedestal which is concavely curved at its underside and is adapted to rest against the cornea when the instrument is held in a vertical attitude. An indentation plunger is mounted in the housing for axial reciprocation on a vertical axis when the housing is in the vertical attitude and is extendible below the undersurface of the pedestal for measuring ocular tension by registering the depth of indentation in the cornea. The indentation plunger is maintained against rotation during axial movement and is mounted such that it will respond with a high order of accuracy to varying weights placed thereon to provide corresponding readings which may be correlated in accordance with generally understood techniques. A vertically extending scale-mounting frame is operatively connected to the support and extends upwardly therefrom and carries a scale assembly having indicia, thereon, the scale assembly being disposed in a common plane with the vertically extending scale-mounting frame. An indicating mechanism is operatively connected to the indentation plunger and includes a pointer directed towards and over the scale assembly for registering the depth of indentation of the cornea. Conveniently, the scale assembly includes a mirror which is arranged behind the pointer and beneath the indicia on the scale assembly to facilitate the accurate readings of the indicia or graduations.

In order to insure a high order of reliability and accuracy in the instrument, the relative movement between the housing and the plunger should be relatively free from the influences of friction. Thus, care has been taken to assure proper weight distribution of the instrument such that there is substantially no tendency for the instrument to cant or tilt out of the vertical attitude when in use which would allow frictional forces to manifest themselves and cause corresponding inaccuracies in readings of ocular tension.

Broadly, it is an object of the present invention to provide an improved tonometer of the aforesaid general construction. Specifically, it is within the contemplation of the invention to provide a tonometer which facilitates the easy reading of the graduations or indicia as registered by the instrument during use, yet does not interfere with the reliability, sensitivity and dependability of the instrument.

In accordance with the present invention, the scale assembly having the graduations or indicia thereon is mounted on the scale-mounting frame in an inclined viewing position, preferably at an attitude of approximately 45° to the horizontal, such that the indicia or graduations can be readily viewed by the physician from above when the tonometer is in a vertical attitude and the pedestal and indentation plunger bear against the cornea of the patient. The indicating mechanisms which are operatively connected to the indentation plunger include a pointer which is directed toward and over the scale assembly for registering the depth and indentation of the cornea. The inclined viewing position of the scale assembly causes an unbalanced weight distribution which introduces frictional binding forces between the housing and the indentation plunger. Such unbalanced weight distribution is compensated for by configurating the scale-mounting frame to counterbalance the unbalanced weight distribution. Advantageously, such counter-balancing is achieved by forming the scale-mounting frame with one or more bends in a direction and of an extent to restore the center of balance of the tonometer to an optimum position in relation to the axis of reciprocation of the indentation plunger wherein there is substantially no tendency for the instrument to cant or tilt when held in a vertical attitude by the physician.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawings, wherein:

FIG. 1 is a front elevational view of an improved tonometer demonstrating features of the present invention;

FIG. 2 is a side elevational view taken from the right of FIG. 1, showing my improved tonometer and in particular illustrating the attitude of the scale assembly and the configuration of the scale-mounting frame;

FIG. 3 is a top plan view of the tonometer as the instrument might be viewed by the physician during use;

FIG. 4 is a perspective view of the scale-mounting frame incorporated in the tonometer; and, FIG. 5 is a fragmentary vertical sectional view taken substantially along the line 5—5 of FIG. 1 and looking in the direction of the arrows, showing the instrument in a typical position of use.

Referring now specifically to the drawings, there is shown an improved tonometer, demonstrating features of the present invention and generally designated by the reference numeral 10. The tonometer 10 comprises a support 12 including a cross head 14 from which depends a cylindrical housing 16 which terminates at its lower end in an outwardly flaring pedestal 18. The underside 18a of the pedestal 18 is concavely curved and is adapted to rest against the surface of the cornea C, as diagrammatically shown in FIG. 5. Disposed within and axially of the depending cylindrical housing 16 is an indentation plunger 20 which is slidably mounted within a closely fitting bore 16a which opens downwardly through the concave undersurface 18a of the pedestal and upwardly through the cross head 14. The indentation plunger 20 is arranged to axially reciprocate on a vertical axis within the housing 16 when the latter is held in a vertical attitude, with the lower end thereof being extendible below the undersurface 18a of the pedestal 18 for indentation into the interlying cornea C to measure the ocular tension thereof by registering the depth of such indentation. At its upper end and at a location above the cross head 14, the indentation plunger 20 carries an appropriately calibrated weight 22 which is externally knurled and is adapted to serve as a platform for further weights which may be added thereto, as is generally understood and will be described hereinafter.

Operatively connected to the cross head 14 is a scale-mounting frame 24 which projects upwardly from the cross head 14. The scale-mounting frame 24, the details of which were seen best in FIG. 4, includes an inverted U-shaped planar base 26 which is adapted to be disposed vertically and includes depending legs 26a, 26b which are secured, as by screws 28, to upwardly projecting ears 14a at the opposite sides at the cross head 14. Projecting upwardly from the planar and vertically extending base 26 of the scale-mounting frame 24 are diverging arms 30a, 30b which are integrally formed at their upper ends with a scale-mounting plate 32 which interconnects the free ends of the arms 30a, 30b. The arms 30a, 30b are integrally joined to the base 26 by respective laterally offsetting members 34a, 34b which serve a purpose to be subsequently described.

Overlying the scale-mounting plate 32 is a scale assembly 36 which includes a curved calibrated plate 38 having indicia or calibrations 40 thereon extending from "0" to "20." The curved calibrated plate 38 is substantially coextensive with the scale-mounting plate 32, but is cut away, as indicated at 38a, to expose a mirror 42 as of high polished metal which is sandwiched between the calibrated plate 38 and the scale-mounting plate 32. The assembly of the scale plate 38 and the mirror 42 are secured to the underlying mounting plate 32 in any appropriate fashion, and by screws or rivets 44.

An indicating mechanism, generally designated by the reference numeral 46, is operatively connected to the upper end of the indentation plunger 20 and includes a pointer 48 which is pivotally mounted on the base 26 of the scale-mounting frame 24 at the pivot 50. The pointer 48 is directed towards and over the scale assembly 36 to provide visual indications of the depth of indentation of the cornea by the plunger 20 in terms of the indicia or calibrations 40. The vertical motion of the plunger 20 is imparted to the pointer 48 by a coupling head 52 which overlies and bears against the reduced diameter upper end 20a of the plunger 20 and it communicates motion to the pointer 48 on an amplified scale, as is generally understood.

The instrument 10 is suspended in a vertical attitude with the pedestal 18 resting against the cornea C and the plunger 20 indenting the cornea C by a suspension means which includes an externally knurled sleeve 54 which embraces the depending housing and carries oppositely directed curved finger pieces 56, 58 which may be grasped between the thumb and forefinger by the user.

In accordance with the present invention, the scale assembly 36, which has the indicia or calibrations 40 thereon, is mounted on the arms 30a, 30b of the scale-mounting frame in an inclined viewing position extending at an acute angle to the vertical axis of reciprocation of the plunger 20. This acute angle is selected such that the calibrations or indicia 40 can be readily viewed from above when the instrument is in a vertical attitude, the optimum angle being approximately 45°. The end of the pointer 48 remote from the pivot 50 is bent at an appropriate angle to the point proper to provide a terminal section 48a which overlies the mirror 42 and is directed toward the calibrations 40 thereby facilitating accurate reading of the instrument by the user, without the introduction of parallax. The establishment of the inclined viewing position for the scale assembly 36 introduces an unbalanced weight distribution and a corresponding shift of the center of mass which causes frictional binding forces between the housing 16 and the indentation plunger 20 which would normally bring about a corresponding inaccuracy in the reading of the instrument. Such unbalanced weight distribution is compensated for by the laterally extending offsetting bends or members 34a, 34b which, with the appropriately arranged arms 30a, 30b, counterbalance the unbalanced weight distribution and tend to establish the center of mass or balance of the tonometer 10 in an optimum position relative to the axis or reciprocation of the plunger and the axis symmetry of the instrument such that the tendency for the instrument to cant or tilt out of the vertical attitude when positioned therein is virtually eliminated.

Since the use of the instrument is generally well understood, only a brief description thereof follows:

In the instrument as illustrated, the combined weight of the plunger 20, the coupling head 52, the needle 48 and the weight 22 equals 5.5 grams and is adapted to provide measurements of very low ocular tension. From time to time, it may become necessary to add further loads or weights to the platform provided by the weight 22. Such weights are usually added by placing either 2.0 grams or 4.5 grams onto the weight 22 to raise the load to either 7.5 or 10 grams to enable measurements of higher tensions. Of course, appropriate charts are provided in association with the instrument which will give readings of ocular tension based upon the reading of the scale or calibrations 40 and the corresponding weight employed in the instrument.

From the foregoing it will be appreciated that there has been provided in accordance with the invention improvements in the tonometer shown in said patent which enable readings of the instrument in higher orders of accuracy and with greater ease. A latitude of modification, substitution and change is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A tonometer comprising a support including a depending housing terminating in a pedestal which is adapted to rest against the cornea when said housing is held in a vertical attitude, an indentation plunger mounted in said housing for axial reciprocation on a vertical axis when said housing is in said vertical attitude and extendible below said pedestal for measuring ocular tension by registering the depth of indentation in said cornea, a scale-mounting frame operatively connected to said support and extending upwardly therefrom, a scale assembly having indicia thereon mounted on the end of said scale-mounting frame remote from said support and disposed in an inclined viewing position extending substantially at an acute angle to said vertical axis, said acute angle being selected such that said indicia can be readily viewed from above when said housing is in said vertical attitude, and an indicating mechanism operatively connected to said indentation plunger and including a pointer directed toward said scale assembly for registering the depth of indentation of said cornea, said scale assembly extending relative to said vertical axis to cause an unbalancing force which tends to cant said housing out of said vertical attitude, said scale-mounting frame being integrally formed with offsetting members extending from said vertical axis to cause a corresponding counterbalancing of said tonometer which counteracts said unbalancing force.

2. A tonometer according to claim 1 wherein said pointer includes an elongated mounting section pivotally mounted on said scale-supporting frame and a terminal section extending at an angle to said mounting section and overlying said scale assembly.

3. A tonometer comprising a support including a depending housing terminating in a pedestal which is concavely curved at its underside and is adapted to rest against the cornea when said housing is held in a vertical attitude, an indentation plunger mounted in said housing for axial reciprocation on a vertical axis when said housing is in said vertical attitude and extendible below the underside of said pedestal for measuring ocular tension by registering the depth of indentation in said cornea, a scale-mounting frame including a planar base disposed vertically and operatively connected to said support and arms extending upwardly therefrom, a scale assembly having indicia thereon mounted on said arms of said scale-mounting frame and disposed in an inclined viewing position extending substantially at an acute angle to said vertical axis, said acute angle being selected such that said indicia can be readily viewed from above when said housing is in said vertical attitude, and an indicating mechanism operatively connected to said indentation plunger and including a pointer directed toward said scale assembly for registering the depth of indentation of said cornea, said scale assembly extending to one side of a reference plane through said base and causing a corresponding unbalancing force which tends to cant said housing out of said vertical attitude, the arms of said scale-mounting frame extending to the other side of said reference plane and causing a corresponding counterbalancing of said tonometer which counteracts said unbalancing force.

4. A tonometer comprising a support including a depending housing terminating in a pedestal which is adapted to rest against the cornea when said housing is held in a vertical attitude, an indentation plunger slidably mounted in said housing for axial reciprocation on a vertical axis when said housing is in said vertical attitude and extendible under the influence of gravity below said pedestal for measuring ocular tension by registering the depth of indentation in said cornea, a scale-mounting frame including a planar base, upwardly directed arms and respective laterally-extending offsetting members joining said arms to said base, means mounting said base on said support with said base extending parallel to and at one side of said vertical axis and said arms extending upwardly therefrom, a scale assembly having indicia thereon mounted on said arms of said scale-mounting frame and disposed in an inclined viewing position extending at an acute angle to said vertical axis, said acute angle being selected such that said indicia can be readily viewed from above when said housing is in said vertical attitude, and an indicating mechanism operatively connected to said indentation plunger and including a pointer pivotally mounted on said scale-mounting frame and directed toward and over said scale assembly for registering the depth of indentation of said cornea, the inclined viewing position of said scale assembly causing an unbalanced weight distribution which introduces frictional binding forces between said housing and said indentation plunger, said laterally-extending offsetting members and said arms being arranged relative to said scale assembly to counterbalance said unbalanced weight distribution.

5. A tonometer comprising a support including a depending housing terminating in a pedestal which is concavely curved at its underside and is adapted to rest against the cornea when said housing is held in a vertical attitude, an indentation plunger slidably mounted in said housing for axial reciprocation on a vertical axis when said housing is in said vertical attitude and extendible under the influence of gravity below the underside of said pedestal for measuring ocular tension by registering the depth of indentation in said cornea, a scale-mounting frame including a planar base, upwardly directed diverging arms and respective laterally-extending offsetting members joining said arms to said base, means mounting said base on said support with said base extending parallel to and at one side of said vertical axis and said arms extending upwardly therefrom, a scale assembly having indicia thereon mounted on the ends of said arms of said scale-mounting frame and disposed in an inclined viewing position extending at an acute angle to said vertical axis, said acute angle being selected such that said indicia can be readily viewed from above when said housing is in said vertical attitude, and an indicating mechanism operatively connected to said indentation plunger and including a pointer pivotally mounted on said scale-mounting frame and directed toward and over said scale assembly for registering the depth of indentation of said cornea, the inclined viewing position of said scale assembly causing an unbalanced weight distribution which introduces frictional binding forces between said housing and said indentation plunger, said laterally-extending offsetting members and said arms being arranged relative to said scale assembly to counterbalance said unbalanced weight distribution.

References Cited by the Examiner
UNITED STATES PATENTS 2,968,941 11/1961 Papritz _____ 73—80
3,062,042 11/1962 Gulden _____ 73—80

RICHARD C. QUEISSER, *Primary Examiner.*

JOSEPH P. STRIZAK, E. P. FORGRAVE, J. J. SMITH,
*Assistant Examiners.*